United States Patent
Wren

(10) Patent No.: US 6,807,878 B2
(45) Date of Patent: Oct. 26, 2004

(54) DEVICE TO PROVIDE CONTINUOUSLY VARIABLE GEAR REDUCTION

(76) Inventor: Nicholas Wren, 303 Whitworth Rd., Boerne, TX (US) 78006

( * ) Notice: Subject to any disclaimer, the term of this patent is extended or adjusted under 35 U.S.C. 154(b) by 54 days.

(21) Appl. No.: 10/064,818

(22) Filed: Aug. 21, 2002

(65) Prior Publication Data

US 2004/0035231 A1 Feb. 26, 2004

Related U.S. Application Data

(63) Continuation-in-part of application No. 09/618,513, filed on Jul. 18, 2000, now Pat. No. 6,447,421.

(51) Int. Cl.[7] .............................................. F16H 29/04
(52) U.S. Cl. ........................... 74/125.5; 74/86; 74/117; 475/170
(58) Field of Search .............................. 74/63, 86, 112, 74/116, 117, 118, 119, 125.5, 395, 396, 397; 475/170, 178, 207

(56) References Cited

U.S. PATENT DOCUMENTS

| 3,359,813 | A | 12/1967 | Okano | |
|---|---|---|---|---|
| 4,902,208 | A | 2/1990 | Wood | 417/462 |
| 4,916,974 | A | 4/1990 | Kozakae et al. | 475/166 |
| 5,048,358 | A | 9/1991 | Shook | 74/112 |
| 5,454,766 | A | 10/1995 | Mills | 475/170 |
| 5,516,132 | A | 5/1996 | Simkins | 280/236 |
| 6,447,421 | B1 * | 9/2002 | Wren | 475/170 |

FOREIGN PATENT DOCUMENTS

| IT | 338385 | 3/1936 |
|---|---|---|
| JP | 0106461 | 5/1988 |
| RU | 0889975 | 12/1981 |
| RU | 3613352 | 10/1997 |

* cited by examiner

Primary Examiner—David A. Bucci
Assistant Examiner—Timothy McAnulty
(74) Attorney, Agent, or Firm—Jackson Walker, LLP

(57) ABSTRACT

A torque transmission device for providing steplessly variable torque conversion. The torque transmission device has a set of unidirectionally-rotatable, slotted levers radiating from a first axis, capable of engaging a torque output ring which is also rotatable on the first axis. An abaxial ring, which has studs that operate in the slots of the levers, is rotatable on a parallel second axis which can orbit the first axis. Torque input induces the second axis to orbit the first, and the force of orbital motion bears, through the abaxial ring, on at least one lever in a direction opposite its rotatable direction, holding it fixed, and also bears on at least one other lever in a direction that coincides with its rotatable direction, causing it to rotate. The fastest-rotating lever engages and drives the torque output ring. Varying the distance between the first and second axes varies the torque conversion ratio.

20 Claims, 6 Drawing Sheets

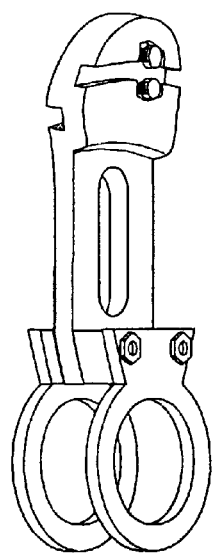 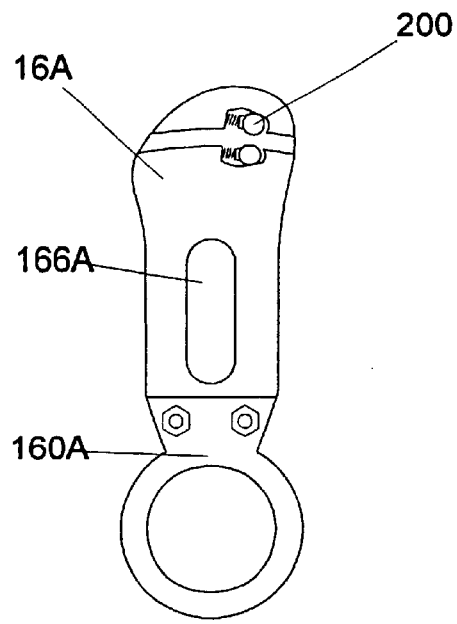
Fig. 3A  Fig. 3B
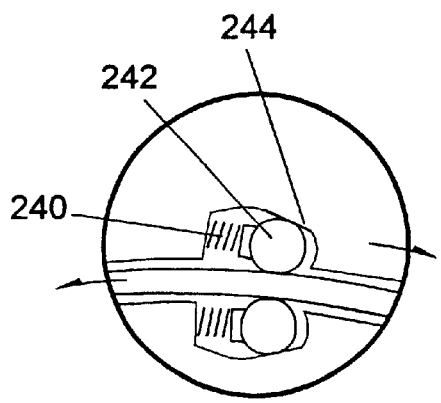 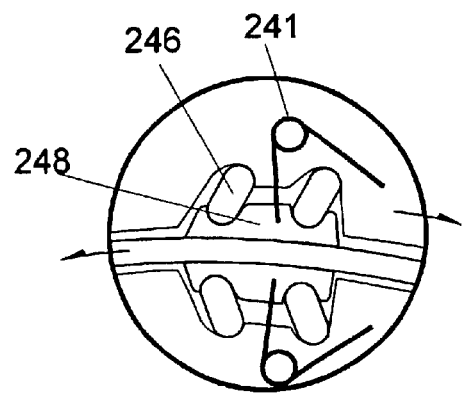
Fig. 4A  Fig. 4B

DEVICE TO PROVIDE CONTINUOUSLY VARIABLE GEAR REDUCTION

CROSS REFERENCE TO RELATED APPLICATIONS

The full disclosure of U.S. patent application Ser. No. 09/618,513 filed Jul. 18, 2000, in its entirety is hereby expressly incorporated by reference into the resent application.

BACKGROUND OF INVENTION

A mechanical transmission device for modifying torque and speed of rotation from torque input to torque output, more particularly a device capable of modifying torque and speed of rotation in a continuously-variable fashion utilizing a set of levers that are unidirectionally rotatable about a first axis, in conjunction with an abaxial ring rotatable about a second axis, the second axis being itself rotatable about the first axis.

To expand the usefulness of rotary power sources, a variety of torque transmission and conversion devices have been developed. Of particular relevance to the device of this application are situations where it is desirable to greatly reduce the rotational speed of a power source in order to shift it into a useable range; where it is desirable to greatly increase the torque of the power source, whatever the speed; and/or where it is desirable to be able to vary the ratio between input and output rotational speed and torque.

Among the most energy-efficient variable transmission systems are the incrementally shiftable systems that employ multiple gears or chains and cogs, but these systems generally require an interruption in power during shifts, sometimes further requiring supplemental clutch devices and gear synchronizers, and where many ratios are required they can become complex, bulky, and difficult to manage. Continuously variable transmissions offer greater versatility and simplify shifting operations, but have tended to have shortcomings of their own which have limited their usefulness.

The hydraulic or electromotive drives, where a motor drives a pump or generator which then powers another motor, are among the most versatile continuously-variable drives. But they are typically massive and not very energy-efficient, so their use has mostly been restricted to heavy industry and high-load work and transport machinery. Also fluid and electricity is subject to leakage, and can behave as a compressible link, so hydraulic and electromotive drives tend to work poorly with low-speed power sources and the ratios between rotational input and rotational output can be unstable, varying with the load.

Limited-slip differential drives employ a split in the torque path with a brake or clutch or something to provide variable drag to select between paths having different ratios. Energy efficiency can be good when either path is fully selected, but there are frictional losses in all intermediate positions and the intermediate ratios tend to be unstable because the constancy of a given ratio is only as good as the proportionality between the friction and the power load.

Traction drives—where a ring, disk, or belt frictionally engages a disk, cone, or sphere at varying radii—have stable ratios throughout their range and are often more energy-efficient than limited-slip drives in the intermediate ratios, but the power is transmitted through a rolling frictional interface. This interface can slip if the shear load from the power exceeds the frictional grip, and it tends to be a focal point for polish, wear, heat buildup, and energy-loss problems.

Among the most efficient of the gear reduction drives are the planetary drives, in which a sun gear drives planetary gears within a ring gear, and where large reductions are desired, multiple stages are ganged together in series. Also reasonably efficient are the harmonic drives in which gears with nearly the same number of teeth are made to mesh either indirectly through rolling index gears traveling around the anchor and output gears or directly by physical deformation of one of the gears by rollers or such. Harmonic drives can achieve great speed reductions in a single stage, typically advancing the output gear only one or two teeth per revolution of the index gears or deformation rollers, but there is much sliding action between the teeth of harmonic drives and they often have flexible components in the load path, so they are poorly suited to high-load applications. Also, both planetary and harmonic drive systems have stable ratios, but they are fixed ratios which cannot be varied, so if multiple ratios are needed, multiple gearsets and changing mechanisms are also needed.

Worm drives are also effective speed reducers, but there is much friction in the interface between the screw and the gear it enmeshes, the output torque is both displaced from and not parallel to the input torque, and the reduction ratio of such drives is not variable.

Potentially some of the most energy-efficient of the continuously variable drives are the oscillation drives, where rotary power is converted to oscillating power and then back again to rotary power, and variable gearing is achieved by varying the amplitude of the oscillations. To have continuous power transmission, there must be at least two oscillating elements, each to take the load while the other is returning. Also, oscillation drives have tended to be not very compact. However, oscillation drives have reasonably stable ratios and they can entirely eliminate the frictional rolling interfaces that traction drives require, so the efficiency and durability can be quite good. The main design challenges of the oscillation drives have been to have the oscillating elements receive and deliver power as tangentially as possible to the rotary elements, and to have the input to output ratios remain highly consistent throughout each cycle, while keeping the total number of elements as few as possible.

The device of this application is a transmission with some, but not all, of the properties of a typical oscillation drive. As with many oscillation drives, rotary power an be supplied in either direction in order to produce output power in a single direction. Unlike with most oscillation drives however, true reciprocal motion in the various parts has been replaced with eccentric and intermittent rotary motion.

The objects of the transmission device here disclosed include a reasonably compact gear reduction transmission of simple, yet versatile, design which does not require exotic materials or manufacturing processes to build; having output torque that is co-axial with the input torque, in a ratio which can be steplessly varied from modest reduction to indefinitely high reduction without any interruption of power; including an integral neutral for zero transmission of power; operating with low friction so as to minimize wear, heat buildup, and power-loss problems; adaptable to high and low load applications; capable of utilizing slow or fast power sources that are either unidirectional or bidirectional in nature; and easily adaptable to provide unidirectional or bidirectional torque output.

Accordingly, this transmission device is thought to have numerous advantages over existing gear reduction systems. This device can match the continuous variability of hydraulic and electromotive transmissions, but unlike with those systems, any selected ratio will be quite stable independent of load, it should have better energy efficiency, and the effectiveness will not diminish even with power sources that have extremely slow rates of rotation. This device can match or exceed the variability of traction drives, but is not dependent upon a rolling frictional interface to transmit torque, so it should be able to handle higher loads without the slippage, heating, and wear problems. This device compares well against the efficiency and ratio stability of planetary, harmonic, and worm drives, but unlike those drives, the ratio between input and output rotation can be steplessly varied over a large range; it does not require multiple stages in series to achieve great gear reductions; and when compared to flexible harmonic drive systems, this should be more suitable for high-load situations.

A transmission with such properties can have applications in diverse areas including gear reductions for electrical motors, turbines, or other high speed rotary power sources where it is desirable to reduce the speed of rotation and have the output speed variable, for example so that the power source can operate at an optimal speed. It could also have application with variable-speed power sources, such as large flywheels, where it is desirable to have a consistent output speed. It could also have utility in compact, low-speed, high-load, rotary or angular applications for portable or battery-powered equipment, such as winches, pincers, prisers, augers, bolt drivers and such, or larger high-load applications such as skid-steer and heavy machinery transmissions, conveyance equipment, turret rotators, flywheel accelerators, centrifugal extractors, or transporters wherein loads must be smoothly accelerated or where great torque is sometimes desirable, but other times less torque and more speed is preferable—especially where a smooth transition between these two states is advantageous. And an application is also seen in hybrid machines, such as electric-assist bicycles, where there is a large mismatch in the optimal operating speeds of two power sources which have to work in conjunction with one another, and particularly if both will need to accommodate a wide range of loads and output speeds. Further objects, advantages, and applications will become apparent from a consideration of the ensuing description and accompanying figures.

SUMMARY OF INVENTION

Applicant's invention employs a rotating torque-input element rotating on a primary axis (the primary axis being an arbitrary reference axis which may be coincident with the axis of a wheel, pulley, crank, gear, or any other rotatable element for delivering or receiving torque); an abaxial element rotating on a secondary axis parallel to, but typically not coincident with, the primary axis; a linkage between the torque element and the secondary axis by which rotation of the torque-input element will urge the secondary axis of the abaxial element to orbit the primary axis; a rotating torque-output element rotatable upon the primary axis; a multiplicity of levers radiating from the primary axis, each rotatable upon the primary axis; devices for sometimes holding each lever unrotatable; devices for engaging each lever with the torque-output element; and lever engagement devices arranged around the abaxial element for engaging the abaxial element with the multiplicity of rotatable levers such that, for each lever, a given point on the abaxial element will lie upon a given radial axis of that lever.

The torque-input element can bear torque directly along the primary axis, such as through an axle, or it can bear torque indirectly from a surrounding housing rotatable upon the primary axis, but an advantage in terms of simplicity is seen in having the torque-input element take the form of a rotatable axle, and this we may call the drive axle. The torque-output engagement devices can engage the levers to the torque-output element at any radius, but since the load on such devices would decrease as the radius increases, an advantage is seen in locating these devices at the far end of the levers, away from the axis of rotation. The torque-output engagement devices can take many forms, but the simplest will tend to be clutch devices which engage and disengage automatically according to the relative motion between the lever and the torque-output element. Because these clutches will be operating at some distance from the primary axis, the torque-output element will tend to be ring-shaped, as in a section of cylinder, cone, or disk, and may thus be referred to as the torque-output ring. There are a variety of ways in which to hold each lever sometimes fixed, but an advantage in economy and versatility is seen in having a structure similar to the torque-output ring, also centered on the primary axis, except having this ring non-rotatable. This may be called the fixed ring, and clutches like the torque-output clutches can sometimes engage each lever to the fixed ring. The abaxial element carrying the lever engagement devices can assume a variety of shapes but for compactness and simplicity of the bearing interface, a ring shape is again generally advantageous, and thus may be referred to as the abaxial ring. There can be a variety of devices for engaging the abaxial ring to each lever such that a given point on the ring lies on a given radial axis of that lever, but one of the simplest would be a stud affixed to the abaxial ring slidably mounted within a radial slot in the lever, and so the lever engagement devices of the abaxial ring may be called abaxial ring studs.

Using these terms, and with reference to the enclosed figures, the operating principle of this device can be described generally in terms of a preferred embodiment. It is seen that the transmission device has a drive axle rotating on a first axis, and a carriage affixed to the axle carrying a ring, namely the abaxial ring, rotating on a second axis such that the second axis rotates with the axle about the first axis. The transmission has a ring which can rotate about the first axis for torque output, and a ring which is fixed but centered on the first axis. It has a set of levers rotatable about the first axis, each lever capable of limited rotation independent of the other levers, and each lever typically has at least two clutches—one to hold it non-rotatable (fixed ring engagement) and the other for torque output (driven ring engagement). Studs are arranged around the abaxial ring, and these studs operate within radially oriented slots within the levers. Radial motion of a stud will cause it to travel along and within its slot, and tangential motion of the stud will cause it to bear against the walls of its slot and impart rotational force to the corresponding lever.

The operation can be summarized as follows. The drive axle is connected by a gear, pulley wheel, or such to a power source. When the drive axle is made to rotate, it urges the secondary axis of the abaxial ring around the axis of the axle. The twist of the axle applies force at the second axis in a direction tangential to its orbit at any given time. Abaxial ring studs which are most in line with this tangent will tend to travel largely in line with the radial axis of their respective levers, and thus will tend to travel in their respective slots imparting little rotation to those levers. Abaxial ring studs which are most perpendicular to this tangent will tend to travel in a direction largely perpendicular to the radial axis of their levers and thus will tend to rotate those levers and will have little travel within their respective slots. The studs most perpendicular to this tangent will lie on opposite sides of the axle, and so will tend to rotate their respective levers in opposite directions about the axle. However, each lever has a clutch which can engage the fixed ring, which clutches collectively operate to ensure that all levers can only rotate in one direction, so the studs most perpendicular to the tangent of the orbit will urge at least one lever on one side of the primary axis against the direction of its fixed-ring clutch and will thus hold it anchored to the fixed ring, but levers on the other side of the primary axis will be urged to rotate in a direction their fixed-ring clutches will allow, and will be free to rotate in that direction. Each lever also has a clutch which engages the torque-output ring, and each torque-output clutch is similarly oriented and configured to ensure that the torque-output ring will rotate in the same direction as each lever and no slower than each lever. Thus where any levers are made to rotate, the torque-output ring clutches ensure that the torque-output ring rotates no slower than the fastest rotating lever, and this will be the lever that drives the torque-output ring. Each lever will, in succession, alternately function as fixed lever and torque-output lever, with an unloaded phase between each state, as the abaxial carriage orbits the primary axis.

The load path is from the drive axle, to the secondary axis, then to the abaxial ring in a direction tangential to the orbit of the secondary axis, then to a lever which cannot rotate as well as to a lever which can rotate, causing the rotation of the rotatable lever, and then out the torque-out clutch on that lever to the torque-out ring. Power is conveyed from the axle to the abaxial ring purely tangentially to the orbit of the abaxial axis. Power is conveyed between the abaxial ring and the levers perpendicularly or nearly so to the radial slot walls. Power is conveyed from the fastest lever to the driven ring purely tangentially to the driven ring rotation. Friction losses between the clutches and rings and between the levers and studs should be minimal. The principle energy losses will most likely be flex losses and normal bearing losses at the abaxial ring and at the center of lever rotation.

If the distance between the axis of the abaxial ring and the axis of the axle is decreased, the force applied at the abaxial ring axis will increase and the tangential velocity will correspondingly decrease if the rotational speed of the drive axle is held constant, so reducing the distance between the first and second axes decreases the speed and increases the torque at the torque-output ring. When the distance between the axis of the abaxial ring and the axis of the axle reaches zero, tangential motion at the abaxial ring axis also reaches zero, and the axle spins freely with no transmission of power. There is a dissymmetry between matching and non-matching directions of rotation between the axle and the torque-output ring, resulting in different amounts of gear reduction, and this attribute of the transmission's operation will be examined in greater detail shortly, with the assistance of FIG. 5.

BRIEF DESCRIPTION OF DRAWINGS

FIGS. 3A and 3B show detail of a drive lever.

FIGS. 4A and 4B show detail of two possible embodiments of a clutch.

Designations and terms used in the figuresare as follows

| Des. | Term | FIGS. |
|---|---|---|
| P | Primary axis | 1, 5 |
| S | Secondary (abaxial ring) axis | 5 |
| A | Transmission housing | 2 |
| B | Torque-Input gear | 1, 2 |
| C | Drive axle | 1, 2, 5, 6, 7 |
| D | Torque-output gear | 2 |
| 12 | Fixed Ring | 1, 2, 5 |
| 14 | Torque-output ring | 1, 2, 5 |
| 16A–E | Levers | 1, 2, 3B, 5 |
| 160A | Lever bearing mounts | 3B |
| 166A | Lever slots | 3B |
| 200, 204 | Fixed-ring clutches | 3B, 5 |
| 220, 224 | Torque-output ring clutches | 5 |
| 240 | Roller-clutch spring | 4A |
| 242 | Roller-clutch roller | 4A |
| 244 | Inclined surface | 4A |
| 241 | Parallelogram-clutch spring | 4B |
| 246 | Parallelogram-clutch thrustlinks | 4B |
| 248 | Parallelogram-clutch shoe | 4B |
| 18 | Abaxial-ring assembly | 5 |
| 18A | Abaxial-ring bearing seat | 1, 2 |
| 18B1–2 | Abaxial-ring halves | 1 |
| 18C1–5 | Abaxial-ring studs | 1, 2, 5 |
| 18D | Abaxial-ring bolt | 1 |
| 18E | Abaxial-ring nut | 1 |
| 18F | Abaxial-ring spacer | 1 |
| 30 | Abaxial-carriage mount | 1, 2, 6, 7 |
| 36 | Abaxial carriage | 1, 2, 6, 7 |
| 38 | Abaxial carriage return spring | 2 |
| 40 | External shift cable | 2 |
| 42 | Thrust-ring collar | 2 |
| 44 | Thrust ring | 1, 2 |
| 46 | Internal shift cable. | 1, 2 |
| 48 | Cable housing | 1, 2 |
| 49 | Cable clamp | 1 |
| 52 | Abaxial-ring bearing | 1, 2 |
| 54A–B | Axle bearings | 1, 2 |
| 55 | Torque-output bearing | 2 |
| 56 | Lever bearing | 1, 2 |
| 58 | Shift thrust bearing | 1, 2 |
| 110 | Input shift gear | 6 |
| 112A–C | Input planet gears | 6 |
| 114A–C | Output planet gears | 6 |
| 116 | Unified planet gear cage | 6 |
| 120 | Indexing annulus | 6 |
| 122 | Indexing screw | 6 |
| 126 | Fixed annulus | 6 |
| 130 | Output shift gear | 6 |
| 136 | Shift cam | 6 |
| 140 | Shift-cam follower | 6 |
| 160A–B | Shift rings | 7 |
| 164 | Shift wheel | 7 |
| 166 | Shift screw | 7 |
| 168 | Shift-screw mount | 7 |
| 170 | Shift-screw follower | 7 |
| 172 | Follower stud | 7 |
| 180A | Gear linked to output ring | 8 |
| 180B | Gear linked to fixed ring | 8 |
| 182 | Locking dog | 8 |
| 184 | Driven gear | 8 |

DETAILED DESCRIPTION

Figure 1:
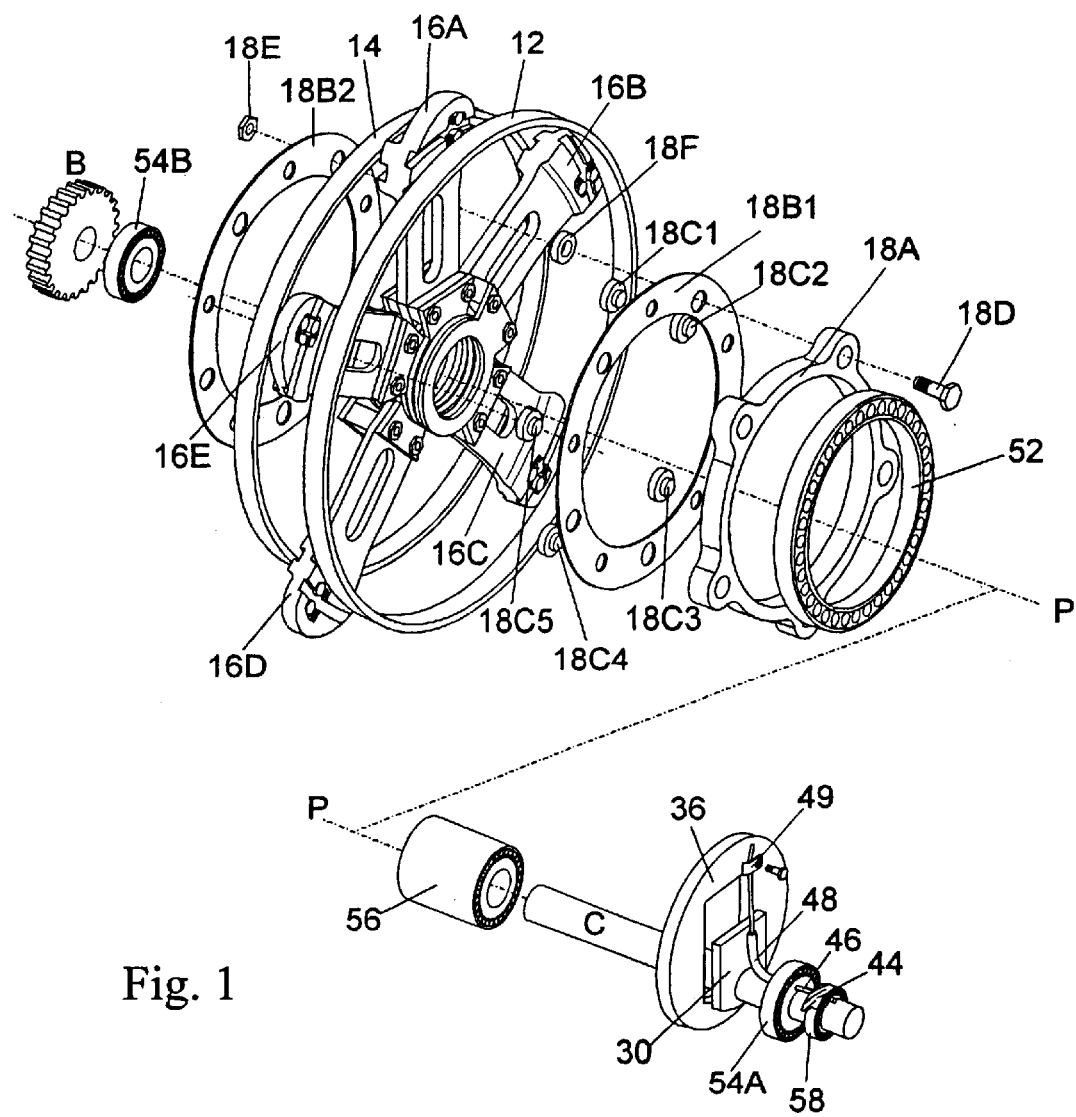
FIGS. 1 and 2 show perspective and section views of Applicant's torque converter.
Figure 2:
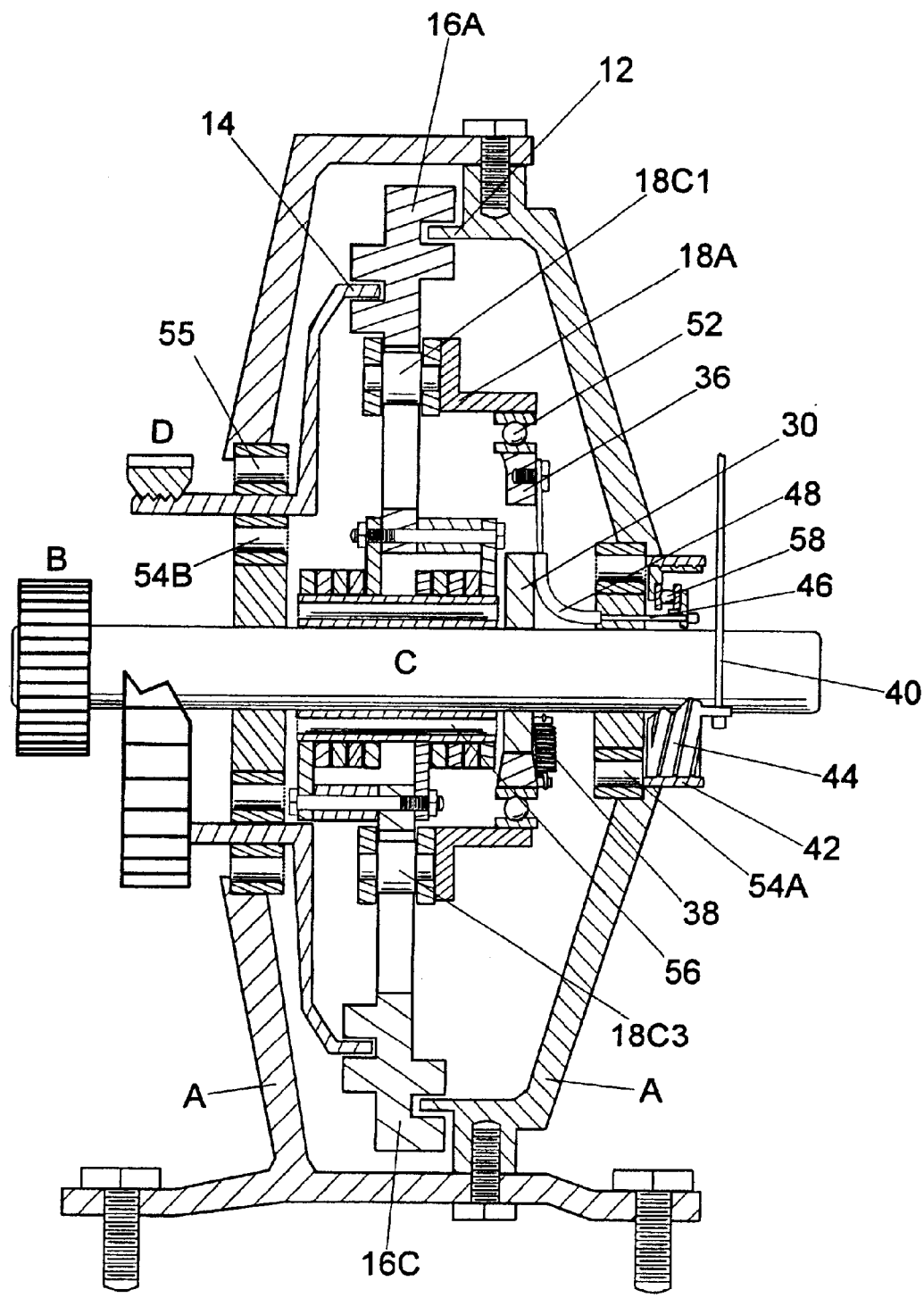

With reference to FIGS. 1 and 2 the torque converter is seen to include an axle rotatable on a first axis, an abaxial ring carriage engaged to the axle, this carriage carrying an abaxial ring rotatable on a second axis, the abaxial ring engaging drive levers rotatable upon the first axis, a non-rotatable fixed ring, and a torque-output ring rotatable on the first axis.

Figure 5:
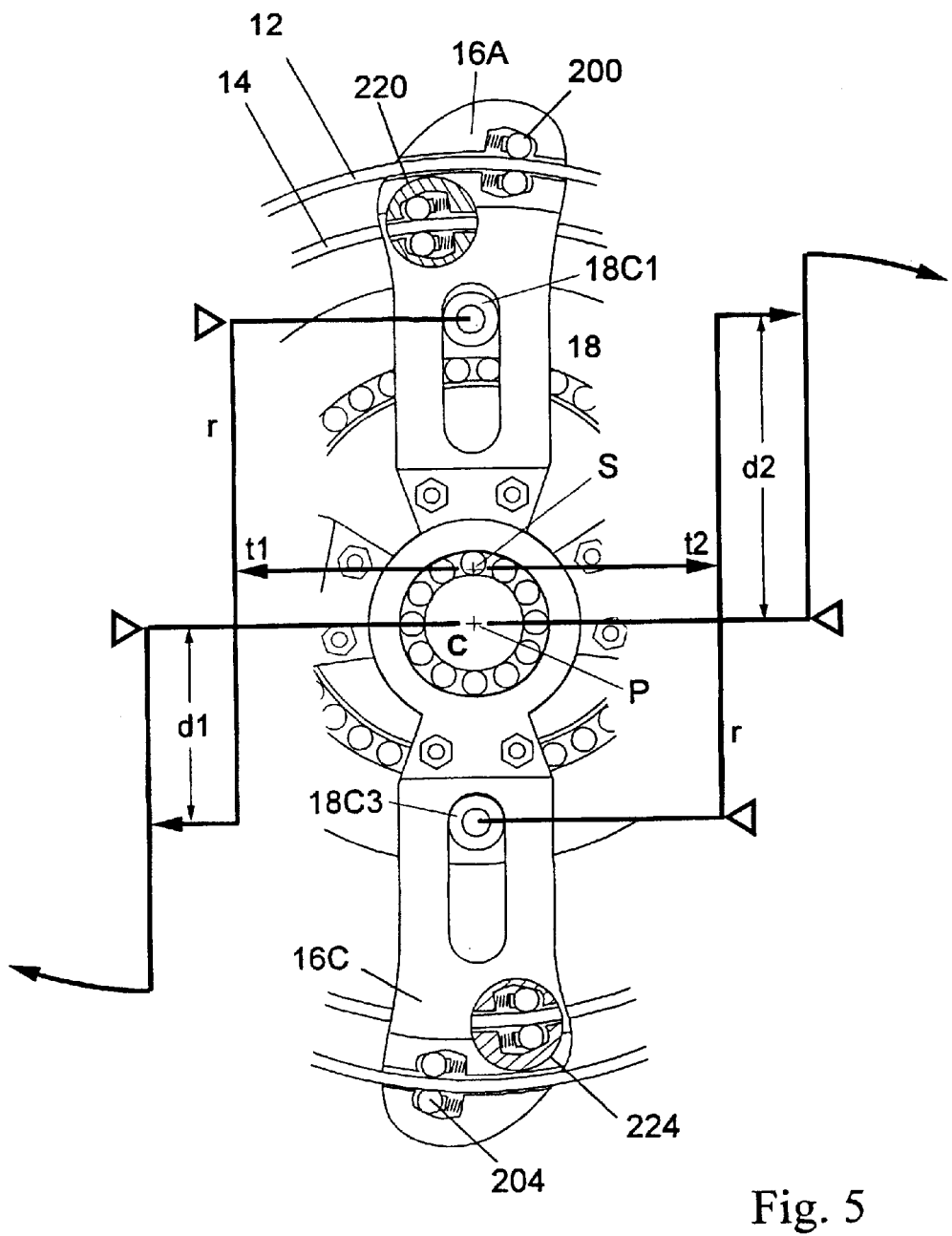
FIG. 5 illustrates the explanation for why torque output is not symmetrical with respect to direction of rotation of the drive axle.

With continuing reference to FIGS. 1 and 2 and with additional reference to FIGS. 3A, 3B, and 5, the components of the device and their functions will be described. An axle C is held rotatable within a housing such as A by bearings such as 54A and 54B, and the axis of the axle forms the primary axis P. Axle C can be linked at either end to a rotary power source, such as through gear B. Affixed to axle C is a transverse section, or block, which serves as a mount 30 for carriage 36, which is slidably coupled to carriage mount 30 such that carriage 36 may be moved radially with respect to the primary axis. Carriage 36 carries bearing 52, which serves as the rotary coupling between carriage 36 and a ring assembly, collectively designated 18 (FIG. 5). This ring assembly, being linked to a carriage which can be moved radially with respect to primary axis P, thus has its own second axis of rotation S. Axis S is parallel to axis P, but is capable of being moved to a position that is non-coincident with axis P. And because carriage 36 is coupled to axle C via carriage mount 30, carriage mount 30, carriage 36, and axis S (when displaced from axis P) will all rotate along with axle C whenever it rotates. This ring assembly with second axis S, also called the abaxial ring assembly, may contain a bearing seat 18A for mounting the assembly onto bearing 52, two ring halves 18B1 and 18B2, spaced apart by spacers such as 18F, for capturing abaxial ring studs 18C1–5 arranged at angular intervals around the abaxial ring assembly; the bearing seat and ring halves being held together and affixed to the bearing seat by bolts and nuts such as 18D and 18E respectively.

Arranged around and radiating from the primary axis P are levers 16A–E (here five in number, but that number may be larger or smaller), each lever being rotatable upon axis P, and each lever being capable of limited rotation independent of the other levers. There is also a fixed ring 12, held fixed within housing A, which is centered on axis P, and a rotatable ring 14 which can rotate upon axis P. Each lever articulated with P is associated with abaxial ring assembly 18, fixed ring 12, and rotatable ring 14, and the nature of those associations are as follows.

As can be seen in FIGS. 1, 2, 3A, 3B, and 5, each lever has a bearing mount, such as 160A, for linking the lever to drive axle C, through bearing 56, so that axle C and the set of levers can rotate independently of one another. The interior of bearing mount 160A may also serve as a bearing between the lever and bearing 56 for limited rotations of each lever about axis P independently of the other levers. A slot, or groove in the body of each lever, such as lever slot 166A, is arranged along a radial axis of the lever and each such slot encloses an abaxial ring stud such that the stud can either travel along the length of the slot, or the stud can bear against the walls that define the slot. Further, each lever has a fixed ring clutch, such as fixed ring clutches 200 or 204 (See FIG. 5) for engaging the lever with the fixed ring—this clutch operating so that each lever may only rotate in one direction relative to the fixed ring, and this direction will be the same for all levers. And each lever has another clutch, such as torque output ring clutches 220 or 224 for engaging the lever with the rotatable ring—this clutch operating so the rotatable ring will rotate in the same direction at no less rate of rotation than any rotating lever. Thus, when several levers are rotating, the least speed rotatable ring 14 can rotate at is the speed of the fastest rotating lever. When there is drag or load on the rotation of rotatable ring 14, it will be driven by the fastest lever. Driven in this fashion, when linked to a means of delivering rotary power, such as gear D, rotatable on bearing 55, rotatable ring 14 can serve as the torque-output means of this transmission device.

To control the displacement of axis S from axis P requires means which are rotatable with axle C for displacing carriage 36 on carriage mount 30, which can nonetheless be controlled from a non-rotatable frame of reference, such as is illustrated for housing A. (Although housing A is depicted as having a non-rotatable frame of reference, this is by no means a necessary requirement and the housing could itself be rotated, for example if it was desirable to operate this torque transmission device in series with other torque transmission devices.) One such means for displacing carriage 36 is illustrated in FIGS. 1 and 2, wherein pulling on an exterior shift cable 40, will rotate a helically grooved thrust ring 44 within a fixed thrust ring collar 42, causing thrust ring 44 to move axially as it rotates. This axial motion can be transmitted through a bearing or rotary coupling such as shift thrust bearing 58 to an interior shift cable 46 which rotates with axle C. The axial motion of this cable can then be redirected into radial motion by arcuate housing 58 to impart a radial pulling force to carriage 36 via cable clamp 49, thereby moving carriage 36 on carriage mount 30. Carriage return spring 38, can return carriage 36 to its former position when thrust ring 44 is allowed to rotate back to its original position. Although the described embodiment has only one abaxial carriage for bearing and locating the abaxial ring, two carriages operating in parallel straddling the levers would serve the same function. Dual carriages would each carry half the load of a single carriage, and the load would not tend to deflect the carriage assembly to one side, as the off-center load on a single carriage would, but the mechanisms needed for shifting the carriages in synchrony would be of somewhat greater complexity than the mechanism needed for shifting a single carriage, so for simplicity of explanation, a single carriage is shown.

FIG. 4A shows detail of a preferred directional ring clutch with spring 240, cylindrical roller 242, and inclined surface 244, such a clutch serving as well for fixed as for torque-output rings. Relative motion between the clutch and the ring is only permitted in the directions indicated by the arrows. Relative motion in the opposite direction is prevented because the roller 242 wedges between inclined surface 244 and the ring surface when force in that direction is applied. When the ring moves in the allowed direction, the roller is no longer wedged and the ring can proceed in that direction relative to the clutch while spring 240 holds roller 242 in contact with both inclined surface 244 and the ring surface.

FIG. 4B shows detail of an alternate directional ring clutch with spring 241, thrust links 246, and clutch shoe 248. The ends of the thrust links can slip pivotally within their respective sockets in the lever and clutch shoe, so this clutch behaves as a deformable parallelogram. Force in the disallowed direction causes the thrust links to "cam" or pivot in a wedging fashion into the face of the ring, and the clutch shoe distributes that force over a large area to prevent materials deformation. Force in the allowed direction causes the links to pivot away from the face of the ring, and spring 241 holds the clutch parallelogram together and clutch shoe 248 lightly in contact with the ring face.

FIG. 5 illustrates why rotating the axle in the same direction as torque output will yield slightly greater torque and less rotation than rotating the axle an equivalent amount in the opposite direction of torque output. In this illustration, the levers can only move clockwise with respect to fixed ring 12, and rotatable ring 14 can only move clockwise with respect to the levers. So configured, the device depicted is only capable of clockwise torque output from this view. For simplification, only the levers which are engaged to fixed ring 12 and rotatable ring 14 are shown. Also, the diagram shows two levers diametrically opposed to one another, but this would more typically happen with an even number of levers, whereas it is generally preferable to have an odd number of levers to minimize gearing fluctuations (as was the case with the fixed-axle transmission described in the referenced related application). In practice, the forces would often be only nearly tangential, and some of the proportions shown would be subject to variation, but this approximation illustrates the basic principle.

With reference to FIG. 5, input torque serving to rotate axle C in an anti-clockwise direction will cause axis S of abaxial ring 18 to orbit anti-clockwise around primary axis P, applying force at S in the direction of tangent arrow t1 in the instant depicted. This force would tend to move ring assembly 18 and studs 18C1 and 18C3 in the same direction as S, which would in turn urge lever 16A to rotate anti-clockwise and lever 16C to rotate clockwise about the primary axis P. However, urging lever 16A to rotate in an anti-clockwise direction causes clutch 200 to engage with fixed ring 12, holding lever 16A immobile. Stud 18C1 is thus prevented from moving in the direction indicated by tangent arrow t1, but stud 18C3 is not prevented from rotating lever 16C in a clockwise direction because fixed-ring clutch 204 releases for clockwise rotation. So abaxial ring 18 will function as a lever of the length represented by bar r, immobile stud 18C1 will act as fulcrum of this lever, and the force applied at S will act on the midpoint of the lever to move stud 18C3 at approximately twice the rate and half the force of that applied at S. Stud 18C3 will in turn apply that force to lever 16C at distance d1 from the fulcrum of lever 16C (ie. axis P) rotating lever 16C clockwise. This engages clutch 224 with rotatable torque-output ring 14 causing it to rotate clockwise as well, at at least the same speed.

Conversely, the application of power rotating axle C in a clockwise direction will cause axis S of abaxial ring 18 to orbit clockwise around primary axis P, applying force at S in the direction of tangent arrow t2 in the instant depicted. This force would tend to move ring 18 and studs 18C1 and 18C3 in the same direction as S, which would urge lever 16A to rotate clockwise and lever 16C to rotate anti-clockwise about the primary axis P. However, urging lever 16C to rotate in an anti-clockwise direction causes clutch 204 to engage with fixed ring 12, holding lever 16C immobile. Stud 18C3 is thus prevented from moving in the direction indicated by tangent arrow t2, but stud 18C1 is not prevented from rotating lever 16A in a clockwise direction because clutch 200 releases for clockwise rotation. As before, abaxial ring 18 will function as a lever of the length represented by bar r, immobile stud 18C3 will act as fulcrum of this lever, and the force applied at S will act on the midpoint of bar r to move stud 18C1 at twice the rate and half the force of that applied at S. Stud 18C1 will in turn apply that force to lever 16A, but this time at distance d2 from the fulcrum of lever 16A (ie. axis P) rotating lever 16A clockwise. This engages clutch 220 to rotatable torque-output ring 14 causing it to rotate clockwise as well, at at least the same speed.

Although the torque output is clockwise in both cases, there is different mechanical advantage because distance d1 (equal to the radius of the abaxial ring minus the offset between P and S) is shorter than distance d2 (equal to the radius of the abaxial ring plus the offset between P and S). Applying force at distance d1 from the axis of rotation will thus produce greater angular motion with less torque than will an equivalent force applied at distance d2.

Figure 6:
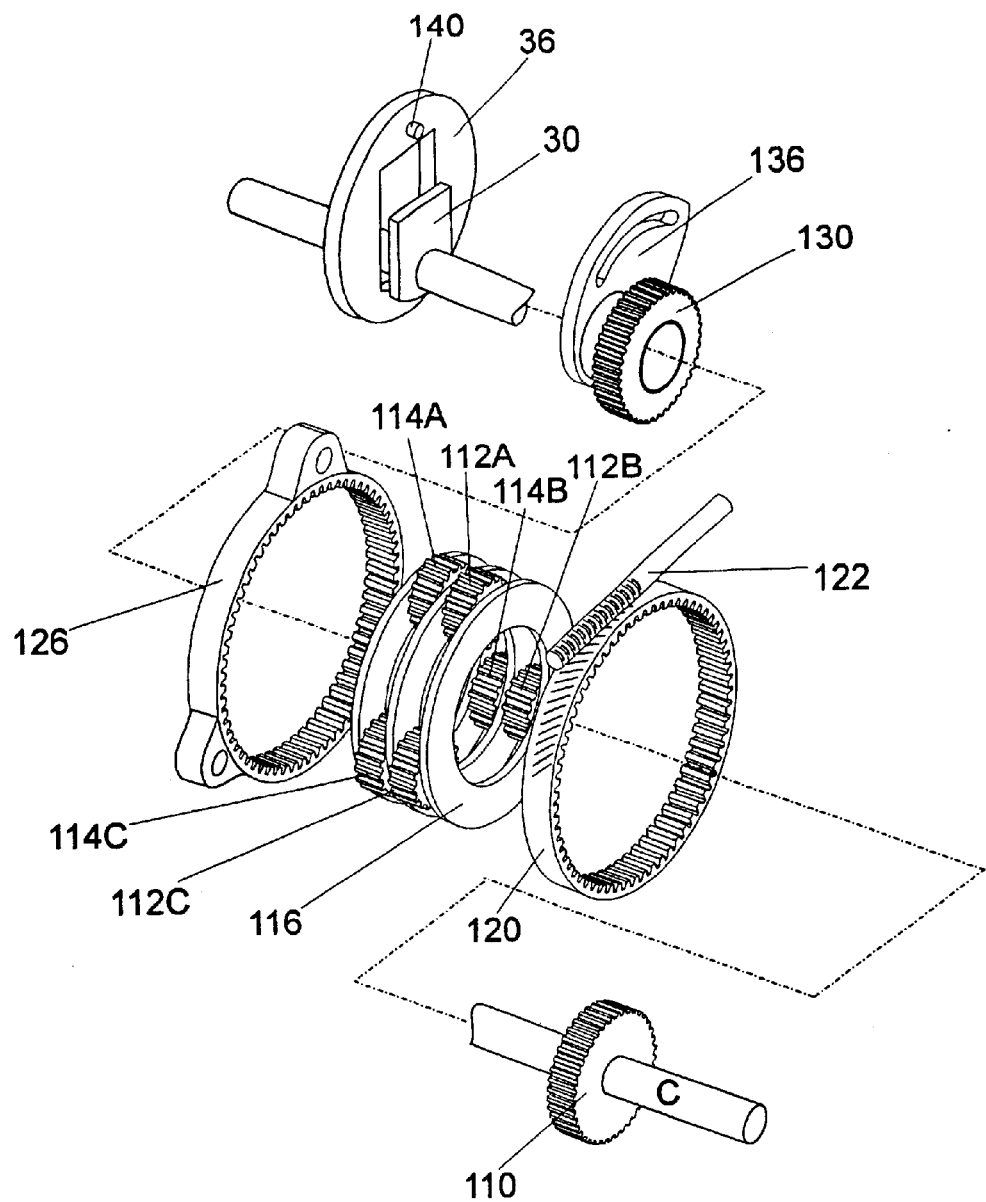
FIGS. 6 and 7 show alternate means by which the distance between the primary and secondary axes may be modified.

FIG. 6 shows detail of an alternate means of displacing carriage 36 on carriage mount 30 containing linked epicycles, an indexing gear, and a shift cam. Shift input gear 110 is affixed to drive shaft C, rotates with drive shaft C, and drives planetary gears 112A within indexing annulus gear 120. Indexing annulus gear 120 is pivotally mounted within a fixed housing, and the rotation of screw 122 rotates annulus 120 in a limited and controlled fashion. Adjacent to indexing annulus 120 is fixed annulus 126. Within annulus 126 orbit planetary gears 114A and planetary gears 114A–C are ganged by a unitary planet gear cage 116 to planetary gears 112A Engaged to each of planetary gears 114A at the center is shift output gear 130. The gearsets are scaled such that the rotation of gear 110 may produce synchronous rotation in gear 130. Gear 130 is linked to a cam 136, and both can jointly rotate independently of axle C, though on the same axis as C. And finally, cam follower 140 on carriage 36 engages cam 136. Thus configured, the ganged rotation of all the planet gears in unison ensure that whenever shift input gear 110 rotates, shift output gear 130 will rotate the same direction at the same speed so long as the two annulus gears remain stationary. When the indexing annulus gear advances, for example, clockwise relative to the fixed annulus gear, planet gears 112A will rotate clockwise relative to their adjacent planet gears 114A and the shift output gear 130 will advance clockwise relative to the shift input gear 110, and this relationship will hold whether axle C is rotating or not. The rotation of gear 130 relative to gear 110 will rotate cam 136 relative to axle C, carriage mount 30, and carriage 36. Rotation of cam 136 will thus cause cam follower 140 and carriage 36 to move toward or away from the axis of axle C according to which direction the cam rotates. It is arbitrary which corresponding elements of the two gearsets are conjoined (shown, it is the planet cages that are conjoined), which elements are fixable and adjustable relative to one another (here, the annulus gears), and which elements serve as torque input and output (here, the sun gears). So long as any two corresponding elements are conjoined, another two corresponding elements are fixable and adjustable, and the remaining two elements are rotatable independently of one another, the basic principle of this shift mechanism obtains.

FIG. 6 shows detail of another alternate means of displacing carriage 36 on carriage mount 30, containing two shift rings, a shift wheel, a screw, a screw mount, and a screw follower. Screw mount 168 is affixed to axle C and rotates therewith, along with screw 166, screw follower 170, and shift wheel 164. Shift rings 160A and 160B, centered on axle C, are held unrotatable, but may be moved axially to bring either into contact with shift wheel 164. When one ring 160A or B is brought into contact with shift wheel 164 and frictionally engages it, rotation of axle C causes wheel 164 to roll against the face of the engaging ring, causing the rotation of screw 166, causing screw follower 170 to move toward or away from axle C, depending on its direction of rotation. Shifting both rings 160A and B over so that the other ring is in contact with shift wheel 164 will reverse the direction of rotation of screw 166 and thus reverse the direction of movement of screw follower 170. By engaging screw follower 170 to carriage 36 through stud 172, carriage 36 can be made to move toward or away from the axis of axle C along with the screw follower.

Figure 7:
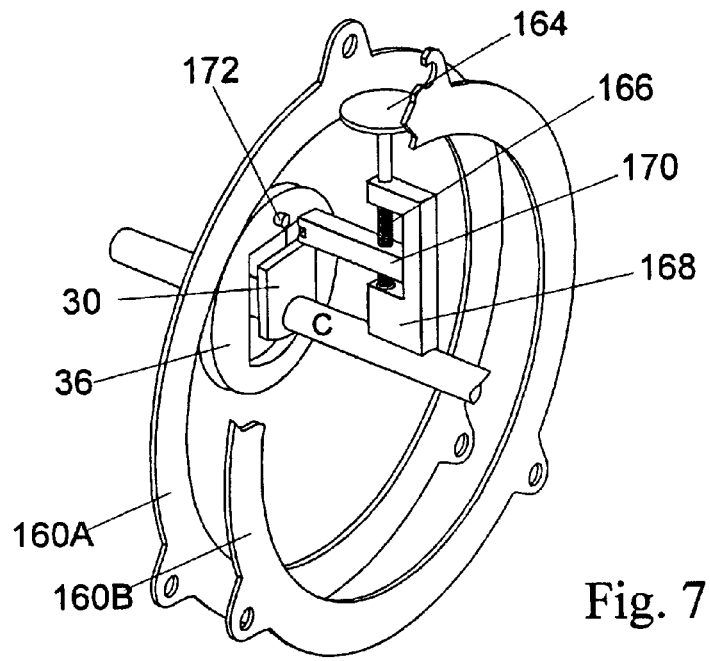
Figure 8:
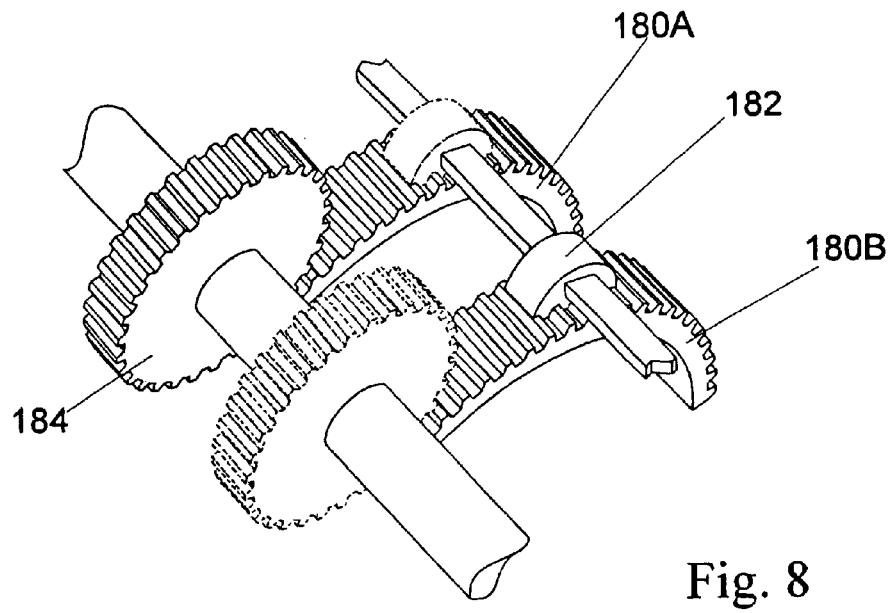
FIG. 8 shows a simple auxiliary device for reversing the roles of fixed ring and torque-output ring.

FIG. 7 shows detail of a supplemental device for reversing the roles of the fixed ring and the torque-output ring, thereby reversing the direction of torque output. Gear 180A is affixed to or linked to rotate with one ring, 12 or 14 (FIG. 1), and gear 180B is affixed to or linked to rotate with the other ring. As depicted, gear 180B would be held fixed by locking dog 182, so the ring linked to this gear would function as the fixed ring. Gear 180A is not locked and so the ring connected to it can serve as torque output, driving gear 184. Shifting locking dog 182 and gear 184 to the alternate positions shown would lock gear 180A and liberate gear 180B to deliver power to gear 184, except in a direction opposite of what was delivered before—effectively reversing the roles of fixed ring and torque-output ring.

Moving locking dog 182 to a position where it was in contact with neither gear 180A nor 180B, or doing likewise for driven gear 184 would be the equivalent of a neutral. In either case, no power would reach gear 184, and backslipping of gear 184 would be possible.

CONCLUSION, RAMIFICATIONS, AND SCOPE

Accordingly, it can be seen that the transmission device of this application has a variety of features which can give it utility in a wide range of applications. It can theoretically deliver any reduction ratio greater than approximately 2:1; it can shift steplessly from that ratio to any other ratio greater than 2:1 without interruption of power; centering the axle can provide a neutral, disengaging power without the need of a supplemental clutch, and the transition from neutral to engaged is smooth and virtually seamless; the ratio selection control is very simple, requiring only a shift in one of two opposite directions—and thus would lend itself readily to linkage to autonomous controls such as centrifugal or torsion load governors; torque input can occur at either end of the axle, so it can be configured to be adjacent to or opposite torque output; torque input is coaxial with torque output; this converter can be configured with minimal auxiliary devices to convert torque in one direction to torque in the same or the opposite direction, or torque in one direction to selectably reversible output torque, or bidirectional input torque to unidirectional output torque in either direction, or bidirectional input torque to selectably reversible output torque—and in all cases, it can be adapted to permit or prevent backslipping; the design is relatively compact for the range and number of ratios it encompasses; it has few basic moving parts, almost all of which can be enclosed in a protective housing; it can be constructed from ordinary metals or plastics using conventional manufacturing processes; it can be scaled up for high-load applications as easily as it can be scaled down for low load applications; the ratios remain stable irrespective of load, even with very slow rotating power sources; the efficiency should compare favorably against existing reduction drives of many kinds; there should be minimal heat buildup or power losses; the durability should be better than for traction or limited-slip drives; and finally, the basic principle can be applied to a large range of configurations to suit various situations, including having large or small fixed and/or output rings, a large or small abaxial ring, having rings on opposite sides or the same side of the lever set, having one or two abaxial-ring carriages, mounted either to an axle or to an off-axis armature or housing that is itself rotatable about the primary axis, and having levers rotatable upon the primary axis either by direct linkage to a central axle, or by indirect rolling linkage to a surrounding circular track.

The basic principle of this transmission device would apply in any case where the abaxial ring carriage is orbited eccentrically around a primary axis; there are means to vary the radius of the orbit; the abaxial ring is rotatable about the abaxial ring carriage; the abaxial ring engages each of a set of unidirectionally rotatable levers; the levers each have an axis of rotation coincident with the primary axis; and the levers each have some means to engage with a ring, cone, or disk rotatable on the primary axis for torque output. Although the invention has been described with reference to specific embodiments, this description is not meant to be construed in a limited sense. It is expected that various modifications of the disclosed embodiments, as well as alternative embodiments of the invention will become apparent to persons skilled in the art upon reference to the description of the invention. It is, therefore, intended that the appended claims or their legal equivalents will cover such modifications that fall within the scope of the invention.

What is claimed is:

1. A torque transmission device comprising:
    a drive element rotatable upon a primary axis serving as means for torque input;
    a driven element with an axis of rotation coincident with the primary axis serving as means for torque output;
    a circular fixed element with an axis of construction coincident with the primary axis;
    a multiplicity of rotatable levers, each lever having an axis of rotation coincident with the primary axis;
    a multiplicity of fixed element engagement devices capable of engaging and disengaging each lever of the multiplicity of rotatable levers with the circular fixed element;
    a multiplicity of driven element engagement devices capable of engaging and disengaging each lever of the multiplicity of rotatable levers with the driven element;
    an abaxial ring with a multiplicity of lever engagement members adapted such that each lever of the multiplicity of rotatable levers is engaged to the abaxial ring, the abaxial ring being rotatable upon a secondary axis which is parallel to the primary axis, and
    carriage means rotatably supporting the abaxial ring, said carriage means capable of being moved so that the secondary axis may be moved to various distances from the primary axis, with the secondary axis capable of being rotated about the primary axis when the secondary axis is not coincident with the primary axis;
    displacement means capable of moving the carriage means so that the distance between the primary axis and the secondary axis may be changed wherein torque applied to the drive element imparts a tangential force at the secondary axis, which force is conveyed through the carriage means to the abaxial ring, and is thereafter divided around the abaxial ring such-that some of the multiplicity of lever engagement members bear on some of the multiplicity of rotatable levers which are in a state of engagement with the circular fixed element, and other some of the multiplicity of lever engagement members bear on other some of the multiplicity of rotatable levers which are in a state of engagement with the driven element, causing the rotation of the rotatable levers which are in a state of engagement with the driven element, thereby causing the rotation of the driven element.

2. The torque transmission device of claim 1 wherein said drive element is an axle.

3. The torque transmission device of claim 1 wherein the driven element and the circular fixed element are rings.

4. The torque transmission device of claim 1 wherein the displacement means include means to provide a mechanical advantage.

5. The torque transmission device of claim 1 further including means adapted to hold the driven element fixed and render the circular fixed element rotatable upon the primary axis whereby the operations of the driven element and the circular fixed element may be interchanged.

6. The torque transmission device of claim 1 wherein some of the multiplicity of fixed element engagement devices or some of the multiplicity of driven element engagement devices are clutches.

7. The torque transmission device of claim 6 wherein said clutches are directional in nature.

8. The torque transmission device of claim 6 wherein said clutches include wedge means.

9. A torque transmission device comprising:
   a housing;
   a drive axle rotatable on its axis;
   a driven ring with an axis of rotation coincident with the axis of the drive axle;
   a fixed ring, integral with the housing, having an axis of construction coincident with the axis of the drive axle;
   a multiplicity of rotatable levers, each lever having an axis of rotation coincident with the axis of the drive axle;
   a multiplicity of fixed ring engagement devices capable of engaging and disengaging each lever of the multiplicity of rotatable levers with the fixed ring;
   a multiplicity of driven ring engagement devices capable of engaging and disengaging each lever of the multiplicity of rotatable levers with the driven ring;
   an abaxial ring having an abaxial ring axis of rotation which is parallel to the axis of the axle, the abaxial ring axis of rotation capable of being rotated about the axis of the drive axle;
   carriage means for engaging the abaxial ring to the drive axle;
   displacement means capable of moving the carriage means such that the distance between the abaxial ring axis of rotation and the axis of the drive axle may be changed;
   lever engagement means capable of engaging each lever of the multiplicity of rotatable levers to the abaxial ring;
   wherein torque applied to the drive axle rotates the abaxial ring axis of rotation about the axis of the drive axle imparting a tangential force at the abaxial ring axis of rotation and, in turn, to the abaxial ring, which force bears on some of the multiplicity of rotatable levers through the lever engagement means causing some of the multiplicity of rotatable levers to engage with the fixed ring, and which force also bears on other some of the multiplicity of rotatable levers through the lever engagement means causing the rotation of other some of the multiplicity of rotatable levers which, in turn, rotate the driven ring through engagement of some of the multiplicity of driven ring engagement devices with the driven ring.

10. The torque transmission device of claim 9 wherein said displacement means include means to provide a mechanical advantage.

11. The torque transmission device of claim 9 further including means adapted to hold the driven ring fixed with respect to the housing and to render the fixed ring rotatable upon the axis of the drive axle whereby the operations of driven ring and fixed ring may be interchanged.

12. The torque transmission device of claim 9 wherein some of the multiplicity of fixed ring engagement devices or some of the multiplicity of driven ring engagement devices are clutches.

13. The torque transmission device of claim 12 wherein said clutches are directional in nature.

14. The torque transmission device of claim 12 wherein said clutches include wedge means.

15. A torque transmission device comprising:
   torque input means rotatable about a primary axis
   torque output means rotatable about the primary axis
   a multiplicity of rotatable levers, each lever having an axis of rotation coincident with the primary axis;
   a multiplicity of torque output engagement devices capable of engaging each lever of the multiplicity of rotatable levers with the torque output means;
   directional lever-locking devices capable of preventing the rotation of each lever
   of the multiplicity of rotatable levers in a given direction; perimeter means fixed with respect to a housing wherein said housing is fixed against rotation about said primary axis and wherein the directional lever-locking devices are capable of engaging said perimeter means;
   an abaxial device acting in operative association with the torque input means and with each lever of the multiplicity of rotatable levers, said abaxial device comprising an eccentric element capable of orbiting the primary axis, means capable of changing the radius of the orbit of the eccentric element, and a lever-engagement element, rotatable about the eccentric element, capable of engaging each lever of the multiplicity of rotatable levers to transfer a force of orbital motion at the eccentric element to bear against some of the multiplicity of rotatable levers which are locked and other some of the multiplicity of rotatable levers which are not locked, causing the rotation of the levers which are not locked, thereby causing the rotation of the torque output means through engagement of some of the multiplicity of torque output engagement devices.

16. The torque transmission device of claim 15 wherein the torque input means is an axle.

17. The torque transmission device of claim 15 further including perimeter means integral with a housing and wherein the directional lever-locking devices are capable of engaging said perimeter means.

18. The torque transmission device of claim 17 wherein the perimeter means and the torque output means are rings.

19. The torque transmission device of claim 17 further including means adapted to hold the torque output means fixed with respect to the housing and render the perimeter means rotatable about the primary axis whereby the operations of torque output means and perimeter means may be interchanged.

20. The torque transmission device of claim 15 wherein some of the multiplicity of torque output engagement devices or some of the directional lever-locking devices are clutches.

* * * * *